United States Patent [19]
Wright

[11] 3,793,895
[45] Feb. 26, 1974

[54] POWER TRANSMITTING DEVICE

[76] Inventor: Herbert L. Wright, 190 N. Cleveland Ave., Mogadore, Ohio 44260

[22] Filed: May 18, 1973

[21] Appl. No.: 361,488

[52] U.S. Cl. ................................................. 74/63
[51] Int. Cl. ............................................ F16h 21/12
[58] Field of Search ............................... 74/63, 437

[56] References Cited
UNITED STATES PATENTS
| | | | |
|---|---|---|---|
| 1,791,025 | 2/1931 | Hague | 74/63 |
| 3,541,869 | 11/1970 | Deutschlander | 74/63 |

FOREIGN PATENTS OR APPLICATIONS
| | | | |
|---|---|---|---|
| 304,543 | 4/1931 | Italy | 74/63 |
| 592,761 | 9/1947 | Great Britain | 74/63 |
| 1,128,620 | 8/1956 | France | 74/63 |

*Primary Examiner*—Benjamin W. Wyche
*Assistant Examiner*—Wesley S. Ratliff, Jr.
*Attorney, Agent, or Firm*—John J. Murphey

[57] ABSTRACT

A power transmitting device in a small compact unit that produces angular velocity of the output shaft as a function of the angular velocity of the input shaft comprising axially aligned input and output shafts, a drive disk mounted on the input shaft, a driven disk mounted on the output shaft adjacent to the drive disk, and a control disk loosely mounted on the output shaft adjacent the driven disk, a set of astroite-shaped grooves formed in the drive and control disks, means spanning the driven disk and riding in the astroite-shaped grooves in the control disk and driven disk to join them together and provide for smooth, uninterrupted power transmission.

17 Claims, 3 Drawing Figures

PATENTED FEB 26 1974 3,793,895

POWER TRANSMITTING DEVICE

BACKGROUND OF THE INVENTION

1. Field of the Invention

This invention pertains to the field of power transmission devices and more particularly to speed changing devices where the input and output shafts are in axial alignment.

2. Description of the Prior Art

Numerous power transmission devices and speed changing mechanisms are known in the art. These devices may be classified in three general categories: 1. Fluid drive devices. 2. Geometric ration devices. 3. Miscellaneous type devices. Examples of the first type include fluid driven turbines either alone or in conjunction with speed changing devices such as planetary gear devices such as in the common automatic automobile transmission. The second category includes mechanisms where speed changing is produced by large wheels driving smaller wheels or vice versa such as in a common block and tackle device. The third category includes a variety of miscellaneous devices such as cams and radial ball races with offset rotor couplings, intermeshing pins with crosscut grooves in rotors, crank pin - crank arm combinations, etc.

By and large, this last group of power transmission devices either comprise units with offset input and output shafts or offset power drive mechanisms. Where offset shafts are involved, engineering allowances must be made therefor and general difficulty is encountered unless specific care is taken to align these misaligned shafts with auxilliary equipment. Where off-center power driven mechanisms are utilized, bending torque becomes a serious problem under heavy load and vibration presents a serious problem in high speed operation. Where axially aligned input and output shafts are utilized with balanced speed reducing drive mechanisms such as in a planetary gear system, the number of parts of the mechanism and the numerous interactions of gear wheels, etc., makes the unit expensive and gives rise to a significant maintenance problem.

SUMMARY OF THE INVENTION

This invention comprises a compact speed changing or power transmitting device of simplified design. The device comprises axially aligned input and output shafts containing rotably balanced components that reduce vibration to a minimum under high speed operation and present little if any bending torque problems under heavy loads. Specific speed reduction or increase is accomplished by interchanging components so that maintenance of auxilliary equipment is minimized.

The main object of this invention is an axially aligned power transmitting device that converts angular velocity of the input shaft to a specified velocity at the output shaft. Other objects of the invention include a simplified device of low initial and operating cost that is fully mechanical and free of fluid cells, reservoirs, etc.; a device where all components are balanced about a common axis to eliminate vibration; a device capable of increased versatility depending upon other factors; a device of compact design and few parts.

These and other objects will become more fully apparent to the reader by studying the accompanying description of the preferred embodiment in conjunction with the drawings attached hereto.

This invention comprises a rotatably mounted drive shaft, a rotatably mounted driven shaft axially aligned to the drive shaft to form a common axis and spaced apart therefrom, a drive disk rigidly mounted on the drive shaft, a driven disk rigidly mounted on the driven shaft in spaced apart relation to the drive disk, a control disk loosely journaled on the driven shaft in spaced apart relation to the driven disk and on the opposite side thereof from the drive disk, the drive disk and the control disk having at least one set of continuous, closed, astroite-shaped depressions formed therein in facing relationship adapted to continuously intersect in at least two points during rotation of one disk with respect to the other disk, means spanning the driven disk for coupling the facing sets of depressions together at their intersections to cause the driven shaft to rotate with respect to the drive shaft, and means for holding the control disk stationary to cause the driven disk to turn when the drive disk is turned.

DESCRIPTION OF THE PREFERRED EMBODIMENT

Figure 1:
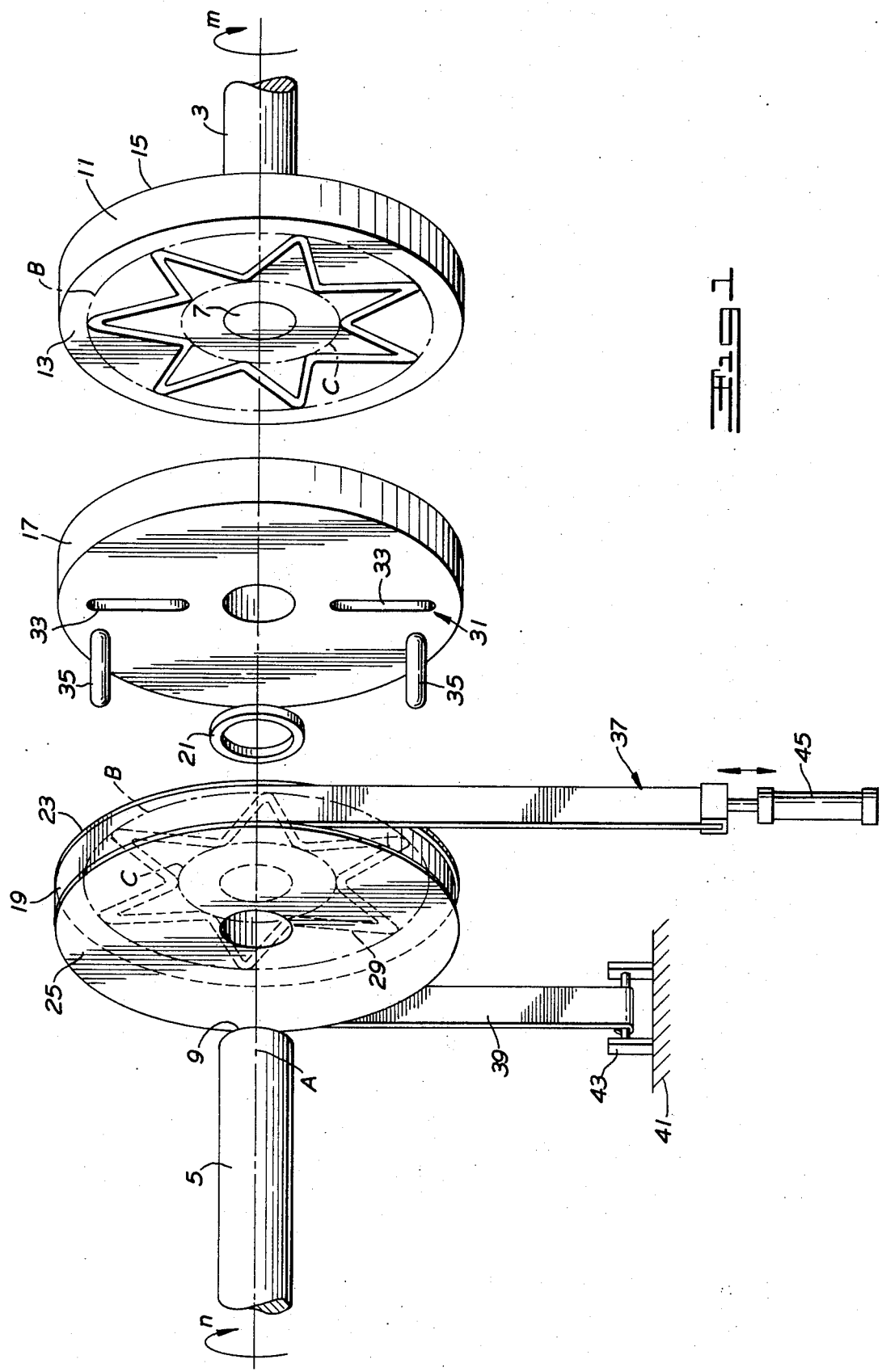
FIG. 1 is an exploded view of one embodiment of the power transmitting device of this invention.

Referring now to the drawings wherein like elements are identified with like numerals throughout the three figures, FIG. 1 shows one embodiment of the power transmitting device of this invention generally indicated at 1 that comprises drive shaft 3 rotatably mounted in a bearing or other journaled means (not shown) and driven shaft 5 that is rotatably mounted in a bearing or other journaled means (not shown). Drive shaft 3 and driven shaft 5 are axially aligned to form a common axis indicated at A and their respective ends 7 and 9 are spaced apart i.e., separated by a finite distance so that one does not interfere with the other.

A flat drive disk or plate 11 is rigidly mounted at its center on drive shaft 3 preferably at drive shaft end 7. Drive disk 3 forms two parallel faces, an inner face 13 and an outer face 15. Spaced slightly apart from drive disk 11 is driven disk or plate 17 that is rigidly mounted on driven shaft 5 at its center of rotation, preferably at or near shaft end 9. The positions of driven disk 17 and drive disk 11 are such that they rotate on their respective shafts about common axis A in adjacent non-touching relation, i.e., disk 17 is positioned adjacent drive disk inner face 13 and spaced apart slightly therefrom. A control disk or plate 19 is loosely journaled about its center of rotation on driven shaft 5 spaced apart from driven disk 17 by a thrust washer 21 or other separating means mounted between the disks on driven shaft 5. Control disk 19 forms two faces, an inner face 23 and an outer face 25. Control disk 19 is positioned on the opposite side of driven disk 17 by thrust washer 21 preferably the same distance as drive disk 11 is spaced from driven disk 17. Control disk 19 is journaled for free rotation on driven shaft 5 by any common bearing means such as a roller bearing, ball bearing, sleeve bearing, etc. (not shown).

Each inner face (inner face 13 of drive disk 11 and inner face 23 of control disk 19), has at least one set of continuous, closed, astroite-shaped depressions 27 and 29 formed therein. The term "astroite-shaped" refers to a star-shaped geometric design formed by straight line grooves or slots whose corners or points of change of direction lie along a theoretical circle (shown in FIG. 1 as dotted line B) marking the outermost boundaries (apogees) of the design and along a concentric theoretical circle (shown in FIG. 1 as dotted line C) marking the innermost boundaries (perigees) of the design. In other words, these closed astroite-shaped depressions are multipointed star-shaped designs whose outer points and inner points all lie along two concentric theoretical circles that are themselves concentric to common axis A. By "closed" is meant that the astroite-shaped design contains one never-ending path.

The sets of astroite-shaped depressions on innerfaces 13 and 23 may contain a different number of apogee and perigee points in each set. However, the points must be of the same radial dimensions. That is to say, the apogee points in both sets of depressions must lie along one circle B concentric to common axis A. Likewise, the perigee points of both sets 27 and 29 must lie along a circle C concentric to common axis A. In addition, the apogee points and perigee points should be equally spaced along the circles such that if innerfaces 13 and 23 were placed in adjacent relationship, the depressions would line up with each other or "intersect" at at least two points equiangularly about common axis A. In most cases, there will be more points of intersections, however, for this invention to be operable, at least two equidistant points of intersection must be realized between the separate sets of astroite-shaped depressions formed in the separate faces.

Driven disk 17 is shown to contain means generally indicated at 31 spanning disk 17 for coupling facing sets of astroite-shaped depressions 27 and 29 together at their intersections. In FIG. 1, means 31 is shown to comprise a pair of radially extending slots 33 in drive disk 17. Cylindrical drive pins 35 ride in slots 33 and are of sufficient length so as to extend beyond both the faces of driven disk 17 into the sets of grooves 27 and 29 formed in faces 13 and 23 respectively.

The intersecting depressions turn to cause pins 35 to rotate in different directions about the main axis. To eliminate binding of the pin and the groove or deprssion, it is suggested that the pin and/or the groove be coated with a low friction surface or the pin made of two pins joined by a bearing that permits opposite rotation of the ends.

Although pins 35 are shown to be round-ended, the shape of the ends depends upon the shape of the grooves. For shallow grooves the pins should be flat ended. For deeper grooves the pins may be more rounded on the ends.

Means 37 for holding control disk 19 stationary is shown to comprise a brake band 39, anchored at one end against a solid surface 41 by mount 43, contacting the circumferential edge of control disk 19 and terminating at the opposite end in a brake cylinder movement 45. Tightening of movement 45 draws brake bank 39 tightly against the edge of control disk 19 thereby preventing its rotary motion while drive disk 11 and driven disk 17 remain in rotary motion.

In operation, drive face 3 is turned at an angular velocity $m$ while means 37 is tightened to prevent rotation of control disk 19. Drive pins 35, the ends of which ride in the astroite-shaped depressions 27 and 29 in inner faces 13 and 23, apply a turning torque to driven disk 17 as the lineup points or points of intersection between the astroite-shaped grooves move about common axis A in a radially cyclical fashion. Pins 35 therefore move radially inward and outward along slots 33 and provide a drive torque thereagainst at an angular velocity $n$ which bears a relationship to the angular velocity of drive shaft 3 by the relationship $m \times X/Y$ where X equals the number of apogee points of set 27 and Y equals the number of apogee points (or perigee points) of set 29. By increasing or decreasing the number of apogee points (or perigee points) in set 29 on control disk 19, one may alter the fixed output angular velocity $n$ with respect to the fixed input angular velocity $m$.

Provided driven disk 17 is made thin enough and inner faces 13 and 23 are set close enough thereto, spheres or ball bearings may be substituted for pins 35 thereby giving more versatility to driven disk 17.

Means 31 may comprise more than two radially extending slots i.e., three or more radially extending slots, equally spaced about common axis A; two slots are the preferred minimum. In addition, in lieu of slots 33 and pins 35, means 31 may comprise two or more pairs of radially extending grooves spaced equidistant about common axis A, each pair of grooves coincidently formed in the opposite faces of driven disk 17. Ball bearings or other drive means would be set in these grooves to ride therein as well as in the grooves of sets 27 and 29.

Figure 2:
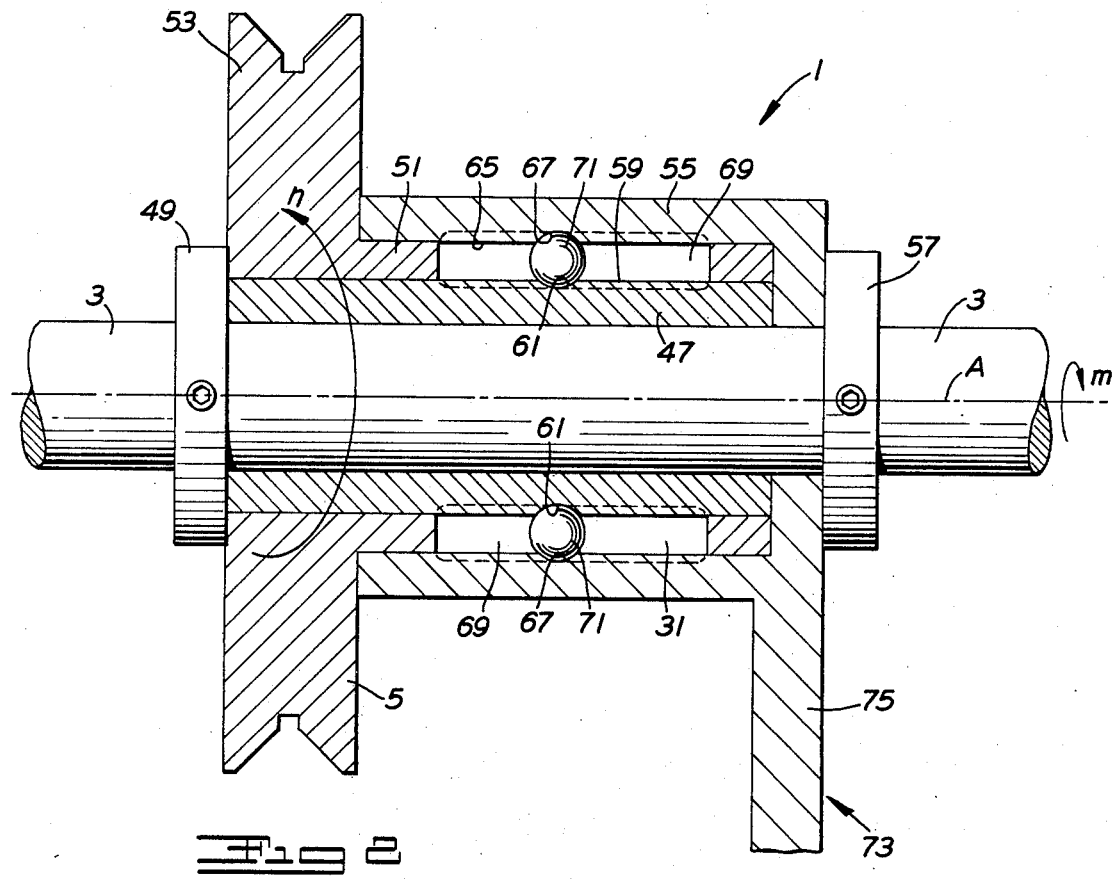
FIG. 2 is a side view partially in section of another embodiment of this invention.

FIG. 2 shows another embodiment of FIG. 1 wherein drive shaft 3 supports a rotatable drive sleeve 47 rigidly mounted thereto at lock collar 49. Slidingly mounted about drive sleeve 47 in concentric relation thereto is driven sleeve 51; the axis of shaft 3, drive sleeve 47 and driven sleeve 51 lie on a common axis A. Rigidly mounted to one end of driven sleeve 51 is driven pulley 53 adapted for rotational movement about common axis A. Concentrically and slidingly mounted about driven sleeve 51 is a control sleeve 55, held in fixed relation to driven sleeve 51 by collar 57, and whose axis of rotation coincides with common axis A. Concentrically and slidingly mounted about driven sleeve 51 is a control sleeve 55, held in fixed relation to driven sleeve 51 by collar 57, and whose axis of rotation coincides with common axis A. Concentrically and slidingly mounted about driven sleeve 51 is a control sleeve 55, held in fixed relation to driven sleeve 51 by collar 57, and whose axis of rotation coincides with common axis A. Drive sleeve 47 has formed in its outer surface 59 at least one set of zigzag shaped grooves 61 whose change of direction points 63 are equidistant and equally spaced about drive shaft 3. Similarly, the inner surface 65 of control sleeve 55 has formed therein a similar set of zigzag shaped grooves 67 whose change of direction points also are equidistant and equally spaced about drive shaft 3. Sets 61 and 67 are spaced apart in facing relationship such that the sets line up with each other or intersect at least at two points equidistant about the common axis A. Driven sleeve 51 contains means 31 for coupling the facing sets 61 and 67 of zigzag depressions together at their intersections and is shown here to comprise a pair of slots 69 spaced equiangularly about and running parallel to common axis A, each slot 69 containing a ball 71 that rides in said slots and protrudes into the lined up or intersecting portions of the two facing sets of zigzag depressions 61 and 67.

Figure 3:
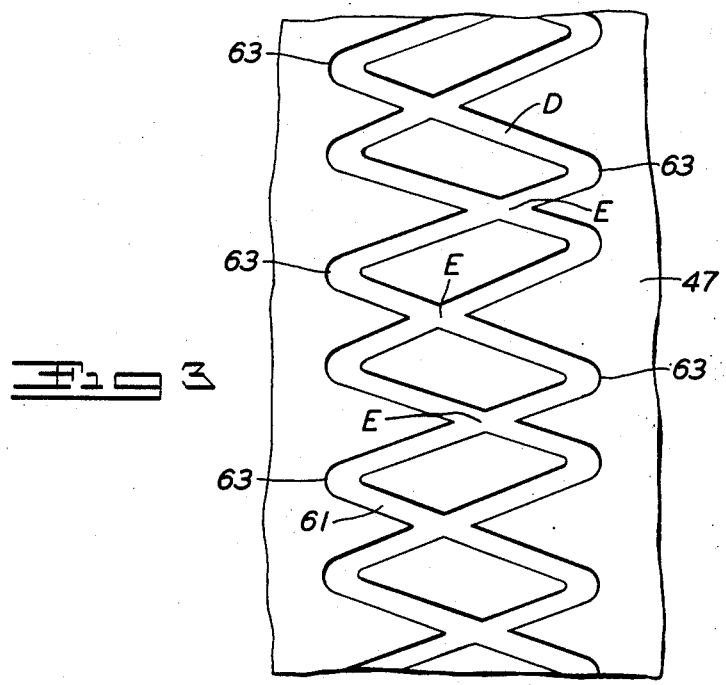
FIG. 3 is a plan view of the drive sleeve of FIG. 2 unrolled to show the design of the zigzag depressions formed therein.

FIG. 3 shows drive sleeve 47 opened up or unrolled to expose set 61 of zigzag grooves. Shown in dotted lines D is an overlay or superimposed outline of zigzag set 67 of different spacing and length. The line-up points or intersections between sets 61 and 67 are noted at E; balls 71 ride in at least two of these points during operation of device 1. As set 61 moves relative to set 67, points E move back and forth along common axis A and also rotate about axis A at an angular velocity equal to that of driven sleeve 51 and driven pulley 53.

As in the embodiment in FIG. 1, facing sets of zigzag depressions 61 and 67 must have their change in direction points equally spaced fore and aft about drive shaft 3 so that as the sets rotate, the ends or change in direction points of the zigzag depressions (comparable to the apogee and perigee points in the embodiment of FIG. 1) must transcribe the same circle at each end of the set.

Means 73 for holding control sleeve 55 stationary is shown to comprise a handle 75 extending from sleeve 55 for grasping and holding stationary; other means are contemplated such as the aforedescribed brake band 39, etc.

In operation, the angular velocity $m$ of drive shaft 3 is converted to a different velocity $n$ from driven pulley 53 through the interaction of zigzag sets 61 and 67 that force balls 71 to slide back and forth in slots 69 and place rotational torque against driven sleeve 51.

As stated earlier with respect to the embodiment of FIG. 1, means 31 may comprise more than two slots equiangularly spaced in driven sleeve 51 about drive shaft 3. Also, the number of points of change of direction in control sleeve 55 (X) and the number of points of change of direction in zigzag set 67 in control sleeve 55 (63 or Y) determines the angular velocity $n$ of driven pulley 53 when ratioed against the angular velocity $m$ of driven shaft 3.

As with astroite-shaped depression sets 27 and 29 in FIG. 1, the points of change in direction between zigzag sets 61 and 67 can be different for each set as long as they are equally spaced about drive shaft 3.

Another embodiment of this invention results in a reverse direction of rotation of driven shaft 5 as well as a change in speed or angular velocity between drive shaft 3 and driven shaft 5. This latter feature, i.e., the change in speed, however, may be eliminated and facing sets of grooves 27 and 29 arranged such that no change in speed is produced.

This embodiment involves only a change in the mode of mounting driven disk 17 and control disk 19. In this new embodiment, control disk 19 is rigidly mounted to driven shaft 5 whereas driven shaft 17 is loosely mounted on either driven shaft 5 or drive shaft 3. However, the arrangement of drive disk 11, driven disk 17 and control disk 19 in side by side spaced apart relationship continues. Means 37 for holding control disk 19 stationary is moved over to engage driven disk 17. This makes driven sidk 17 a control disk and control disk 19 a driven disk in this new embodiment.

By energizing means 37 to hold driven disk 17 stationary, control disk 19 now is given a reverse torque by pins 35 thereby causing driven shaft 5 to rotate in the opposite direction from that of drive shaft 3.

Both of these embodiments may be incorporated into one device by utilizing known mounting means at the center of disks 17 and 19 to provide for rigid and loose mounting on the respective shafts at will.

What is claimed is:

1. A power transmitting device, comprising:
   a. a rotatably mounted drive shaft;
   b. a rotatably mounted driven shaft axially aligned to said drive shaft to form a common axis and spaced apart therefrom;
   c. a drive disk rigidly mounted on said drive shaft;
   d. a driven disk rigidly mounted on said driven shaft in spaced apart relation to said drive disk;
   e. a control disk loosely journaled on said driven shaft in spaced apart relation to said driven disk and on the opposite side thereof from said drive disk;
   f. said drive disk and said control disk each having at least one set of continuous, closed, astroite-shaped depressions, having apogee and perigee points of equal radial distances with respect to each other from said common axis formed therein in facing relationship adapted to continuously match in at least two points during rotation of one said disk with respect to the other;
   g. means spanning said driven disk for coupling said facing sets of depressions together at ther intersections to cause said driven shaft to rotate with respect to said drive shaft; and,
   h. means for holding said control disk stationary to cause said driven disk to turn when said drive disk is turned.

2. The device of claim 1 wherein said means spanning said driven disk for coupling said facing sets of depressions together comprises at least two radially extending slots in said drive disk and means in each said slot having portions thereof extending into said facing sets of depressions.

3. The device of claim 2 wherein said radially extending slots in said drive disk are equiangularly spaced about said common axis.

4. The device of claim 2 wherein said means in each said slot comprises a cross pin of low friction resistance slidingly received in said slot and adapted to reciprocate radially about said common axis in the intersections of said facing sets of astroite-shaped grooves.

5. The device of claim 2 wherein said means in each said slot comprises a ball of low friction resistance slidingly received in said slot and adapted to reciprocate radially about said common axis in the intersections of said facing sets of astroite-shaped grooves.

6. The device of claim 1 wherein said means for holding said disks stationary comprises a band encircling the circumference of said control disk and means for tightening said band against said disk so that the friction therebetween will hold said disks stationary during rotation of said device.

7. The device of claim 1 wherein each said facing set of astroite-shaped depressions has apogees and perigees equally radially spaced with respect to each other and with respect to said common axis.

8. A power transmitting device, comprising:
   a. a rotatably mounted drive shaft;

b. a rotatably mounted driven pulley axially aligned to said drive shaft to form a common axis and spaced apart therefrom;

c. a drive sleeve rigidly mounted on said drive shaft;

d. a driven sleeve rigidly mounted on said driven shaft in concentric, sliding relationship to said drive sleeve;

e. a control sleeve loosely journaled on said driven shaft in concentric, sliding relationship to said driven sleeve and on the opposite side thereof from said drive disk;

f. said drive sleeve and said control sleeve each having at least one set of continuous zigzag-shaped depressions formed therein, wherein said change of direction points are equally spaced with respect to each other fore and aft along said common axis in facing relationship adapted to continuously match in at least two points during rotation of one said sleeve with respect to the other;

g. means spanning said driven sleeve for coupling said facing sets of zigzag depressions together at their intersections to cause said driven shaft to rotate with respect to said drive shaft; and, h. means for holding said non-rotating sleeve stationary to cause said driven sleeve to turn when said drive sleeve is turned.

9. The device of claim 8 wherein said means spanning said sleeve for coupling said facing sets of zigzag grooves comprises at least two radially extending slots in said sleeve and means in each said sleeve having portions thereof extending into said zigzag grooves;

10. The device of claim 9 wherein said radially extending slots in said sleeve are equiangularly spaced about said common axis.

11. The device of claim 9 wherein said means in each said slot comprises a ball of low friction resistance slidingly received in said slot and adapted to reciprocate longitudinally along said common axis in the intersections of said facing sets of zigzag grooves.

12. The device of claim 8 wherein said means for holding said control sleeve stationary comprises a handle extending from said sleeve for holding said control sleeve stationary during rotation of said drive shaft.

13. A power transmitting device for producing reverse rotation, comprising:

a. a rotatably mounted drive shaft;

b. a rotatably mounted driven shaft axially aligned to said drive shaft to form a common axis and spaced apart therefrom;

c. a drive shaft rigidly mounted on said drive shaft;

d. a driven disk rigidly mounted on said driven shaft in spaced apart relation to said drive disk;

e. a control disk loosely journaled on either said drive shaft or said driven shaft and positioned between said drive disk and said driven disk in spaced apart relation thereto;

f. said drive disk and said driven disk having at least one set of continuous, colsed, astroite-shaped depressions, having apogee and perigee points of equal radial distances with respect to each other from said common axis formed therein in facing relationship adapted to continuously match in at least two points during rotation of one said disk with respect to the other;

g. means spanning said control disk for coupling said facing sets of depressions together at their intersections to cause said driven shaft to rotate with respect to said drive shaft; and, h. means for holding said control disk stationary to cause said driven disk to turn in the opposite direction when said drive disk is turned.

14. The device of claim 13 wherein said means spanning said driven disk for coupling said facing sets of depressions together comprises at least two radially extending slots in said drive disk and means in each said slot having portions thereof extending into said facing sets of depressions.

15. The device of claim 14 wherein said radially extending slots in said drive disk are equiangularly spaced about said common axis.

16. The device of claim 14 wherein said means in each said slot comprises a cross pin of low friction resistance slidingly received in said slot and adapted to reciprocate radially about said common axis in the intersections of said facing sets of astroite-shaped depressions.

17. The device of claim 14 wherein said means for holding said disks stationary comprises a band encircling the circumference of said control disk and means for tightening said band against said disk so that the friction therebetween will hold said disk stationary during rotation of said device.

* * * * *